United States Patent
Shivhare et al.

(10) Patent No.: US 10,079,753 B2
(45) Date of Patent: Sep. 18, 2018

(54) MULTI-DROP UNIDIRECTIONAL SERVICES IN A NETWORK

(71) Applicant: Ciena Corporation, Hanover, MD (US)

(72) Inventors: Anand Kumar Shivhare, Gurgaon (IN); Anand Vadakke Kurupath, New Delhi (IN); Deepti Rawat, New Delhi (IN)

(73) Assignee: Ciena Corporation, Hanover, MD (US)

( * ) Notice: Subject to any disclaimer, the term of this patent is extended or adjusted under 35 U.S.C. 154(b) by 133 days.

(21) Appl. No.: 15/050,507

(22) Filed: Feb. 23, 2016

(65) Prior Publication Data

US 2017/0201452 A1    Jul. 13, 2017

(30) Foreign Application Priority Data

Jan. 11, 2016  (IN) .............................. 201611000933

(51) Int. Cl.
*H04J 14/08* (2006.01)
*H04L 12/707* (2013.01)
(Continued)

(52) U.S. Cl.
CPC ........... *H04L 45/22* (2013.01); *H04B 10/038* (2013.01); *H04J 14/08* (2013.01); *H04L 45/123* (2013.01);
(Continued)

(58) Field of Classification Search
CPC .............. H04J 14/0283; H04J 14/0227; H04J 14/0295; H04J 14/08; H04B 10/032;
(Continued)

(56) References Cited

U.S. PATENT DOCUMENTS 8,457,001 B2  6/2013 Madrahalli et al.
8,509,055 B2  8/2013 Khan et al.
(Continued)

OTHER PUBLICATIONS

ITU-T G.8080/Y.1304; Telecommunication Standardization Sector of ITU; Series G: Transmission Systems and Media, Digital Systems and Networks; Packet over Transport aspects—Ethernet over Transport aspects; Series Y:Global Information; Infrastructure, Internet Protocol Aspects and Next-Generation Networks; Feb. 2012.

(Continued)

*Primary Examiner* — Ted Wang
(74) *Attorney, Agent, or Firm* — Clements Bernard Walker PLLC; Christopher L. Bernard; Lawrence A. Baratta, Jr.

(57) ABSTRACT

Systems and methods for a multi-drop, unidirectional service in a network include, responsive to a source point, one or more drop points, and a routing consideration, computing a path in the network; causing establishment of the multi-drop, unidirectional service on the computed path, through one of a control plane and a Software Defined Networking (SDN) controller; and managing the multi-drop, unidirectional service through the one of the control plane and the SDN controller. The multi-drop, unidirectional service has the source point at an originating node, one or more drop points at associated intermediate nodes, zero or more intermediate nodes with no drop points, and one or more drop points at associated terminating nodes.

18 Claims, 7 Drawing Sheets

(51) Int. Cl.
*H04B 10/038* (2013.01)
*H04L 12/721* (2013.01)
*H04Q 11/00* (2006.01)

(52) U.S. Cl.
CPC . *H04Q 11/0066* (2013.01); *H04Q 2011/0081* (2013.01)

(58) Field of Classification Search
CPC ......... H04B 10/038; H04Q 2011/0081; H04Q 11/0066; H04L 45/22; H04L 45/123
See application file for complete search history.

(56) References Cited

U.S. PATENT DOCUMENTS

| | | | |
|---|---|---|---|
| 8,509,113 | B2 | 8/2013 | Connolly et al. |
| 8,665,889 | B2 | 3/2014 | Gopalakrishna et al. |
| 8,718,471 | B2 | 5/2014 | Prakash et al. |
| 8,854,955 | B2 | 10/2014 | Prakash et al. |
| 2008/0304407 | A1* | 12/2008 | Umansky ............. H04L 12/437 370/222 |
| 2010/0054731 | A1 | 3/2010 | Oltman et al. |
| 2013/0230052 | A1* | 9/2013 | Gopalakrishna ....... H04J 3/1611 370/401 |
| 2013/0315580 | A1* | 11/2013 | Boertjes ............. H04J 14/0204 398/5 |
| 2014/0298052 | A1* | 10/2014 | Meirosu ............. H04L 41/0833 713/320 |
| 2015/0016815 | A1* | 1/2015 | Maggiari ........... H04J 14/0287 398/5 |
| 2015/0023368 | A1 | 1/2015 | Connolly et al. |
| 2015/0365193 | A1* | 12/2015 | Connolly ........... H04L 41/0803 398/52 |
| 2016/0119076 | A1* | 4/2016 | Gareau .................. H04L 12/66 398/49 |

OTHER PUBLICATIONS

E. Mannie; Network Working Group; Generalized Multi-Protocol Label Switching (GMPLS) Architecture; The Internet Society (2004), Oct. 2004.

Open Network Foundation; OpenFlow Switch Specification; Version 1.5.1 ( Protocol version 0x06 ); ONF TS-025; Mar. 26, 2015.

A. Doria et al.; Network Working Group; General Switch Management Protocol (GSMP) Applicability; The Internet Society (2002); Jun. 2002.

A. Doria et al.; Internet Engineering Task Force (IETF); Forwarding and Control Element Separation (ForCES) Protocol Specification; Standards Track; Mar. 2010.

* cited by examiner

MULTI-DROP UNIDIRECTIONAL SERVICES IN A NETWORK

CROSS-REFERENCE TO RELATED APPLICATION(S)

The present patent application/patent claims the benefit of priority of Indian Patent Application No. 201611000933, filed on Jan. 11, 2016, and entitled "MULTI-DROP UNIDIRECTIONAL SERVICES IN A NETWORK," the contents of which are incorporated in full by reference herein.

FIELD OF THE DISCLOSURE

The present disclosure generally relates to networking systems and methods. More particularly, the present disclosure relates to multi-drop, unidirectional services in a network with a control plane and/or under Software Defined Networking (SDN) control.

BACKGROUND OF THE DISCLOSURE

Optical networks and the like (e.g., Dense Wave Division Multiplexing (DWDM), Synchronous Optical Network (SONET), Synchronous Digital Hierarchy (SDH), Optical Transport Network (OTN), Ethernet, and the like) at various layers are deploying control plane systems and methods. Control planes provide an automatic allocation of network resources in an end-to-end manner. Exemplary control planes may include Automatically Switched Optical Network (ASON) as defined in ITU-T G.8080/Y.1304, Architecture for the automatically switched optical network (ASON) (February 2005), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); or any other type control plane for controlling network elements at multiple layers, and establishing connections among nodes. Control planes are configured to establish end-to-end signaled connections such as Subnetwork Connections (SNCs) in ASON or OSRP and Label Switched Paths (LSPs) in GMPLS and MPLS. Note, as described herein, SNCs and LSPs can generally be referred to as services in the control plane. Also, note the aforementioned control planes are circuit-based control planes, e.g., operating at Layer 1 (Time Division Multiplexing (TDM)) and/or Layer 0 (wavelengths). Control planes use the available paths to route the services and program the underlying hardware accordingly.

In addition to control planes which are distributed, a centralized method of control exists with Software Defined Networking (SDN) which utilizes a centralized controller. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). Examples of SDN include OpenFlow (www.opennetworking.org), General Switch Management Protocol (GSMP) defined in RFC 3294 (June 2002), and Forwarding and Control Element Separation (ForCES) defined in RFC 5810 (March 2010), the contents of all are incorporated by reference herein. Note, distributed control planes can be used in conjunction with centralized controllers in a hybrid deployment.

Advantageously, control plane and/or SDN management provide a rich set of Operations, Administration, Maintenance, and Provisioning (OAM&P) features for underlying services in the network. One particular type of service may include a multi-drop, unidirectional service. Note, typically most network services are bi-directional between a source node and a destination node. A unidirectional service only transmits from the source node to the destination node. A multi-drop unidirectional service transmits from the source node to the destination node with one or more intermediate drops of the service at intermediate nodes. An example of a multi-drop, unidirectional service may include a video broadcast. Conventionally, multi-drop, unidirectional services are manually supported in optical networks with manual Flexible Cross Connects (FCCs) provisioned at the intermediate nodes. Disadvantageously, the manual support for these services does not allow the use of the rich set of management features in control planes and/or SDN such as route calculation, mesh restoration, single point and click configuration, and the like.

BRIEF SUMMARY OF THE DISCLOSURE

In an exemplary embodiment, a method for a multi-drop, unidirectional service in a network includes, responsive to a source point, one or more drop points, and a routing consideration, computing a path in the network; causing establishment of the multi-drop, unidirectional service on the computed path, through one of a control plane and a Software Defined Networking (SDN) controller; and managing the multi-drop, unidirectional service through the one of the control plane and the SDN controller. The multi-drop, unidirectional service has the source point at an originating node, one or more drop points at associated intermediate nodes, zero or more intermediate nodes with no drop points, and one or more drop points at associated terminating nodes. The managing can include, responsive to a fault in the network affecting one or more drop points, causing mesh restoration for an alternate path to the affected one or more drop points; and causing establishment of the alternate path. The managing can include, responsive to a change in drop points the one or more drop points, implementing the change without affecting the one or more drop points.

The managing can include, at an intermediate node, utilizing a Flexible Cross Connect with a single Virtual Connection Point used only for bridging. The routing consideration can include one of optimal bandwidth where common sections are leveraged to multiple drop points, shortest path where a shortest path is used to each of the one or more drop points, and a user designated route where a user specifies the path. The managing can utilize the routing consideration during service creation, mesh restoration, and addition or deletion of drop points and adherence to the routing considerations is via a best effort to avoid any service disruption for existing drop points. The method can further include utilizing part of the computed path for a second multi-drop, unidirectional service, in an opposite direction as the multi-drop, unidirectional service. The multi-drop, unidirectional service can be a Layer 1 Time Division Multiplexing (TDM) service.

In another exemplary embodiment, a node in a network supporting a multi-drop, unidirectional service includes one or more ports; and a controller communicatively coupled to the one or more ports, wherein the controller is configured to, responsive to a source point, one or more drop points, and a routing consideration, compute a path in the network, cause establishment of the multi-drop, unidirectional service on the computed path, through one of a control plane and a Software Defined Networking (SDN) controller, and manage the multi-drop, unidirectional service through the one of the control plane and the SDN controller. The multi-drop, unidirectional service has the source point at an originating node, one or more drop points at associated intermediate nodes, zero or more intermediate nodes with no drop points, and one or more drop points at associated terminating nodes. To manage the multi-drop, unidirectional service, the controller can be configured to, responsive to a fault in the network affecting one or more drop points, cause mesh restoration for an alternate path to the affected one or more drop points, and cause establishment of the alternate path. To manage the multi-drop, unidirectional service, the controller can be configured to, responsive to a change in drop points the one or more drop points, cause the change without causing a service disruption for the existing one or more drop points.

To manage the multi-drop, unidirectional service, the controller is configured to utilize a Flexible Cross Connect with a single Virtual Connection Point used only for bridging. The routing consideration can include one of optimal bandwidth where common sections are leveraged to multiple drop points, shortest path where a shortest path is used to each of the one or more drop points, and a user designated route where a user specifies the path. To manage the multi-drop, unidirectional service, the controller can be configured to utilize the routing consideration during service creation, mesh restoration, and addition or deletion of drop points and adherence to the routing considerations is via a best effort to avoid any service disruption for existing drop points. The controller can be configured to utilize part of the computed path for a second multi-drop, unidirectional service, in an opposite direction as the multi-drop, unidirectional service. The multi-drop, unidirectional service can be a Layer 1 Time Division Multiplexing (TDM) service.

In a further exemplary embodiment, a network supporting a multi-drop, unidirectional service includes a plurality of nodes interconnected to one another via a plurality of links; wherein the multi-drop, unidirectional service is established based on a computed path responsive to a source point, one or more drop points, and a routing consideration, through one of a control plane and a Software Defined Networking (SDN) controller, and wherein the control plane and the SDN controller are configured to manage the multi-drop, unidirectional service. The multi-drop, unidirectional service has the source point at an originating node, one or more drop points at associated intermediate nodes, zero or more intermediate nodes with no drop points, and one or more drop points at associated terminating nodes.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to multi-drop, unidirectional services in a network with a control plane and/or under SDN control. Specifically, systems and methods are described providing a new multi-drop, unidirectional service that can be managed by a control plane and/or SDN. The multi-drop, unidirectional service supports multiple drop points as well as multicast network traffic. Since the multi-drop, unidirectional service is unidirectional, bandwidth in the other direction can be utilized for another unidirectional traffic flow through the control plane and/or SDN. The systems and methods support hitless addition/deletion of drop points at intermediate nodes via the control plane and/or SDN. Also, the systems and methods enable bandwidth optimization for a shared path for traffic distribution to the intermediate drop points. The systems and methods offer bandwidth optimization such as the use of opposite direction bandwidth, mesh restoration support for unidirectional traffic, and ease of configuration as compared to manual FCC configuration on multiple nodes in the path.

In an exemplary embodiment, the multi-drop, unidirectional service is a multi-drop unidirectional SNC for Synchronous Optical Network (SONET), Synchronous Digital Hierarchy (SDN), or Optical Transport Network (OTN) traffic. The multi-drop, unidirectional service can also be an LSP in GMPLS or flow in SDN, as well as support other protocols. For illustration purposes, the foregoing descriptions reference the multi-drop, unidirectional service as an SNC, but those of ordinary skill in the art will appreciate the multi-drop, unidirectional service could equally apply to LSPs, flows, and other managed services by a control plane and/or SDN control. The multi-drop, unidirectional service is mesh restorable and support multicast services across an optical backbone network. A drop-and-continue configuration is supported on intermediate nodes, and addition and deletion of drop points are hitless without affecting traffic on existing drop points. From a terminology perspective, multi-drop unidirectional means traffic is carried in one direction from a source node to one or more terminating drops which can include intermediate nodes and a destination node. Unlike existing SNCs, a multi-drop SNC has multiple termination points. There will be multiple terminating nodes each node having a single or multiple drop points. Each node on the path will be capable of dropping and/or continuing the traffic.

Exemplary Network

Figure 1:
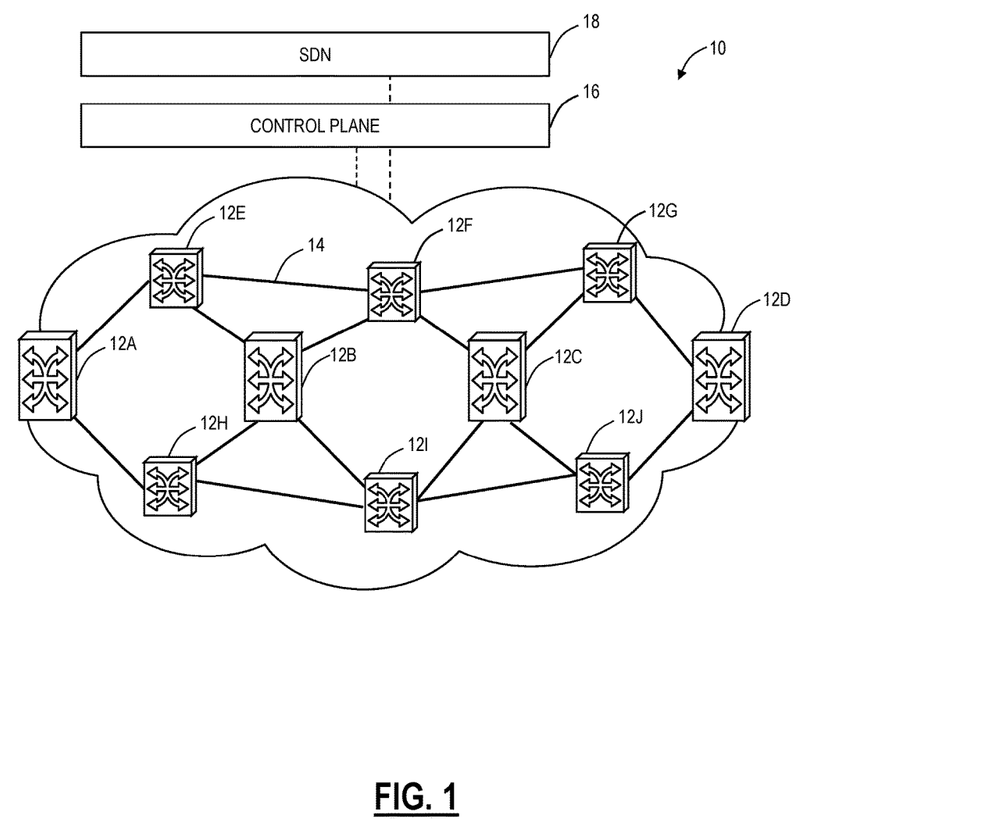
FIG. 1 is a network diagram of an exemplary network with various interconnected nodes.
Figure 2:
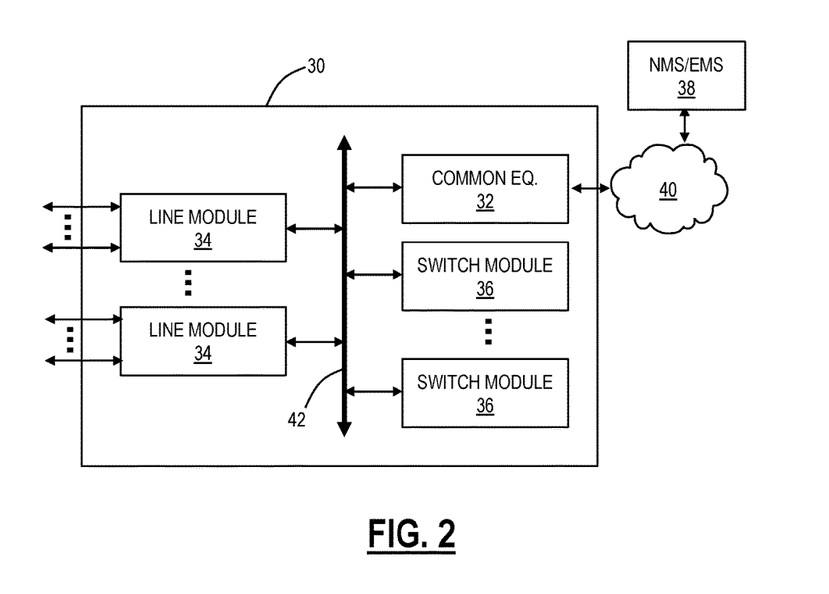
FIG. 2 is a block diagram of an exemplary node for use with the systems and methods described herein.

Referring to FIG. 1, in an exemplary embodiment, a network diagram illustrates an exemplary network 10 with various interconnected nodes 12 (illustrated as nodes 12A-12J). The nodes 12 are interconnected through a plurality of links 14. The nodes 12 communicate with one another over the links 14 through Layer 0 (L0), Layer 1 (L1), Layer 2 (L2), and/or Layer 3 (L3) protocols. For example, L0 can be the DWDM layer, L1 can be the Time Division Multiplexing (TDM) layer with SONET, SDH, or OTN, and L2/L3 can be packet. The nodes 12 can be network elements which include a plurality of ingress and egress ports forming the links 12. An exemplary node implementation is illustrated in FIG. 2. The network 10 can include various services between the nodes 12. Each service can be at any of the L0, L1, L2, and/or L3 protocols, such as a wavelength, an SNC, an LSP, etc., and each service is an end-to-end path or an end-to-end signaled path and from the view of the client signal contained therein, it is seen as a single network segment managed by a control plane 16 and/or an SDN controller 18. The nodes 12 can also be referred to interchangeably as network elements (NEs). The network 10 is illustrated, for example, as an interconnected mesh network, and those of ordinary skill in the art will recognize the network 10 can include other architectures, along with additional nodes 12 or with fewer nodes 12, etc.

The network 10 can include the control plane 16 operating on and/or between the nodes 12. The control plane 16 includes software, processes, algorithms, etc. that control configurable features of the network 10, such as automating discovery of the nodes 12, capacity on the links 14, port availability on the nodes 12, connectivity between ports; dissemination of topology and bandwidth information between the nodes 12; calculation and creation of paths for connections; network level protection and mesh restoration; and the like. In an exemplary embodiment, the control plane 16 can utilize ASON, GMPLS, OSRP, MPLS, Open Shortest Path First (OSPF), Intermediate System-Intermediate System (IS-IS), or the like. Those of ordinary skill in the art will recognize the network 10 and the control plane 16 can utilize any type of control plane for controlling the nodes 12 and establishing connections between the nodes 12.

The SDN controller 18 can also be communicatively coupled to the network 10 through one or more of the nodes 12. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports.

Note, the network 10 can use the control plane 16 separately from the SDN controller 18. Alternatively, the network 10 can use the SDN controller 18 separately from the control plane 16. In another exemplary embodiment, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18.

In the terminology of ASON and OSRP, sub-network connections (SNC) are end-to-end signaled paths since from the point of view of a client signal, each is a single network segment. In GMPLS, the connections are an end-to-end path referred to as LSPs. For example, LSPs for GMPLS are described in draft-ietf-ccamp-gmpls-ospf-g709v3-13, "Traffic Engineering Extensions to OSPF for Generalized MPLS (GMPLS) Control of Evolving G.709 OTN Networks," (Dec. 11, 2013), the contents of which are incorporated by reference herein. In SDN, such as in OpenFlow, services are called "flows." In the various descriptions herein, reference is made to SNCs for illustration only of an exemplary embodiment of the systems and methods. Those of ordinary skill in the art will recognize that SNCs, LSPs, flows, or any other managed service in the network can be used with the systems and methods described herein. Also, as described herein, the term services is used for generally describing connections such as SNCs, LSPs, flows, etc. in the network 10.

Exemplary Network Element/Node

Referring to FIG. 2, in an exemplary embodiment, a block diagram illustrates an exemplary node 30 for use with the systems and methods described herein. In an exemplary embodiment, the exemplary node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, etc. into a single, high-capacity intelligent switching system providing Layer 0, 1, and/or 2 consolidation. In another exemplary embodiment, the node 30 can be any of an OTN Add/Drop Multiplexer (ADM), a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 30 can be any digital system with ingress and egress digital signals and switching of channels, timeslots, tributary units, etc. While the node 30 is generally shown as an optical network element, the systems and methods contemplated for use with any switching fabric, network element, or network based thereon.

In an exemplary embodiment, the node 30 includes common equipment 32, one or more line modules 34, and one or more switch modules 36. The common equipment 32 can include power; a control module; Operations, Administration, Maintenance, and Provisioning (OAM&P) access; user interface ports; and the like. The common equipment 32 can connect to a management system 38 through a data communication network 40 (as well as a Path Computation Element (PCE), the SDN controller 18, OpenFlow controller, etc.). The management system 38 can include a network management system (NMS), element management system (EMS), or the like. Additionally, the common equipment 32 can include a control plane processor, such as a controller 50 illustrated in FIG. 3 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical or electrical connectors, or the like.

The line modules 34 are configured to provide ingress and egress to the switch modules 36 and to external connections on the links to/from the node 30. In an exemplary embodiment, the line modules 34 can form ingress and egress switches with the switch modules 36 as center stage switches for a three-stage switch, e.g. a three-stage Clos switch. Other configurations and/or architectures are also contemplated. The line modules 34 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 34 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between as well as future, higher rates. The line modules 34 can include WDM interfaces, short reach interfaces, and the like, and can connect to other line modules 34 on remote network elements, end clients, edge routers, and the like, e.g. forming connections on the links in the network 100. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an exemplary embodiment, the switch modules 36 provide OTN switching and/or Ethernet switching.

The nodes 12 in the network 10 can include the node 30. Those of ordinary skill in the art will recognize the node 30 can include other components which are omitted for illustration purposes, and that the systems and methods described herein are contemplated for use with a plurality of different network elements with the node 30 presented as an exemplary type of network element. For example, in another exemplary embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 30 is merely presented as one exemplary node 30 for the systems and methods described herein.

Exemplary Controller

Figure 3:
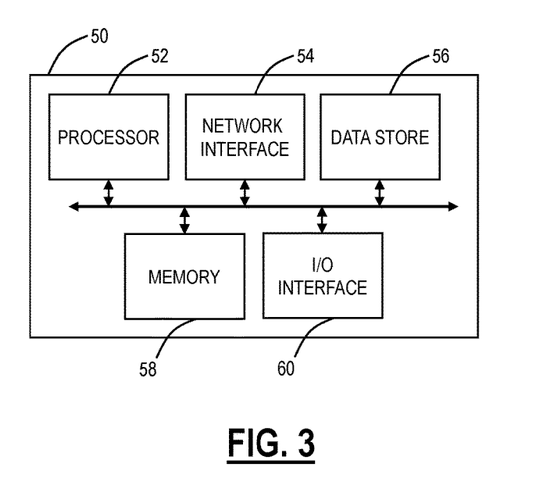
FIG. 3 is a block diagram of a controller to provide control plane processing and/or OAM&P for the node, and/or to implement the SDN controller.

Referring to FIG. 3, in an exemplary embodiment, a block diagram illustrates a controller 50 to provide control plane processing and/or OAM&P for the node 30, and/or to implement the SDN controller 18. The controller 50 can be part of the common equipment, such as common equipment 32 in the node 30, or a stand-alone device communicatively coupled to the node 30 via the DCN 40. In a stand-alone configuration, the controller 50 can be the SDN controller 18, an NMS, a PCE, etc. The controller 50 can include a processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and with the processor 52.

The network interface 54 can be used to enable the controller 50 to communicate on the DCN 40, such as to communicate control plane information to other controllers, to the management system 38, to the nodes 30, and the like. The network interface 54 can include, for example, an Ethernet card (e.g., 10 BaseT, Fast Ethernet, Gigabit Ethernet) or a wireless local area network (WLAN) card (e.g., 802.11). The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with OTN signals.

In an exemplary embodiment, the controller 50 is configured to communicate with other controllers 50 in the network 10 to operate the control plane for control plane signaling. This communication may be either in-band or out-of-band. For SONET networks and similarly for SDH networks, the controllers 50 may use standard or extended line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 50 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane and/or SDN signaling.

The controller 50 is configured to operate the control plane 16 in the network 10. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus, a plurality of the controllers 50 can act together to operate the control plane using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc.

Multi-Drop, Unidirectional Service

Figure 4:
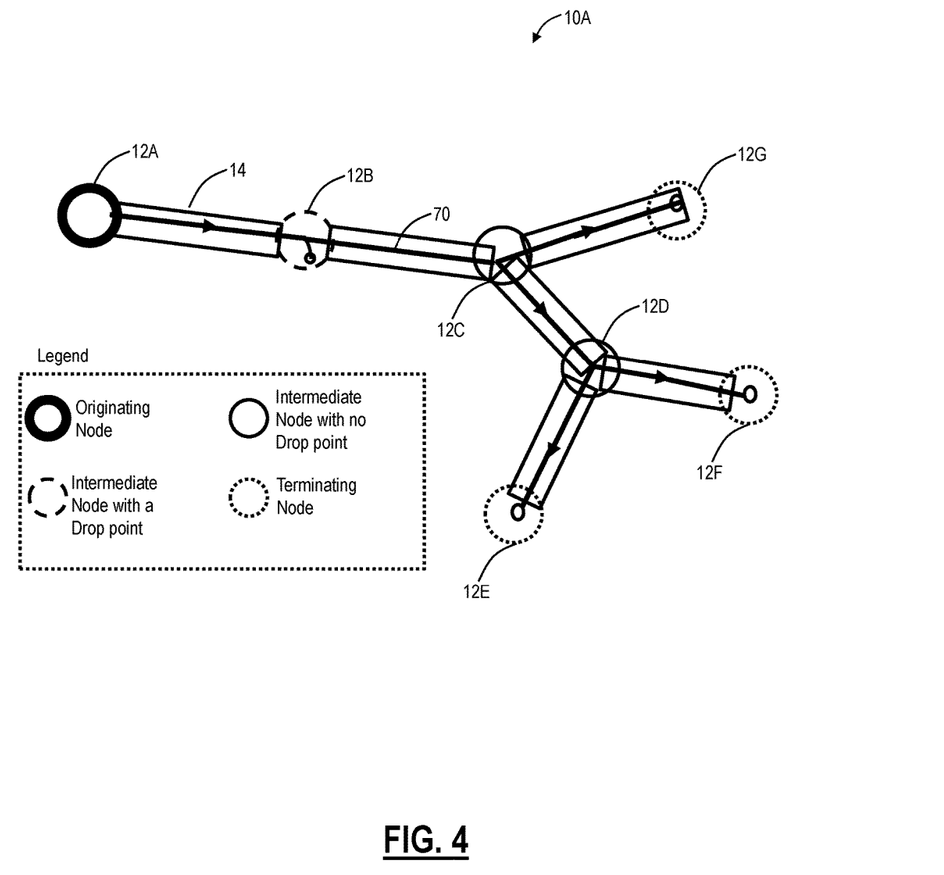
FIG. 4 is a network diagram of a network with interconnected nodes with a multi-drop, unidirectional service.

Referring to FIG. 4, in an exemplary embodiment, a network diagram illustrates a network 10A with interconnected nodes 12A-12G with a multi-drop, unidirectional service 70. The node 12A is the originating node (also referred to as the source node). The node 12B is an intermediate node with a drop point. The nodes 12C, 12D are intermediate nodes without drop points, but with branches for the multi-drop, unidirectional service 70. Specifically, intermediate nodes can have drop points, no drop points, branches, and no branches. A branch is not a drop point, but a point where the multi-drop, unidirectional service 70 egresses to more than one link 14. The intermediate nodes without drop points simply forward the traffic associated with the multi-drop, unidirectional service 70. The nodes 12E, 12F, 12G are terminating nodes (also referred to as destination nodes). Thus, in operation, the multi-drop, unidirectional service 70 from the node 12A provides traffic to the nodes 12B, 12E, 12F, 12G and the traffic transits through the nodes 12C, 12D.

In an exemplary embodiment, the multi-drop, unidirectional service 70 is implemented by creating Unidirectional-Flexible-Cross-Connects (UFCC) instead of Permanent Virtual Circuits (PVC) (cross-connects). FCCs use Virtual Connection Points (VCP) for bridging the traffic on originating, intermediate and terminating nodes. A VCP is a logical object that is maintained in software that defines a connection between real network resources in hardware, as well as other logical objects. The VCP has a point of input selection. Due to its unidirectional nature, it acts as a source connection point for multicasting. The use of VCPs enables efficient multicast, drop-and-continue, protection, bridge-and-roll, test access point, and circuit switching applications, among others. VCPs are described, for example, in commonly assigned U.S. Pat. No. 8,509,113 issued on Aug. 13, 2013, and entitled "METHODS AND SYSTEMS FOR MANAGING DIGITAL CROSS-CONNECT MATRICES USING VIRTUAL CONNECTION POINTS," the contents of which are incorporated by reference. As the multi-drop, unidirectional service 70 is unidirectional, a selection mechanism is not required. Drop ports can be dynamically created/deleted on intermediate nodes also.

In a conventional SNC, cross connects are created on originating, intermediate and terminating nodes. These cross connects have a single source and a single sink in each direction. The conventional SNC uses both a selection and bridging mechanism whereas in the multi-drop, unidirectional service 70, the SNC selection mechanism is not required as there is no traffic in the return direction.

Figure 5:
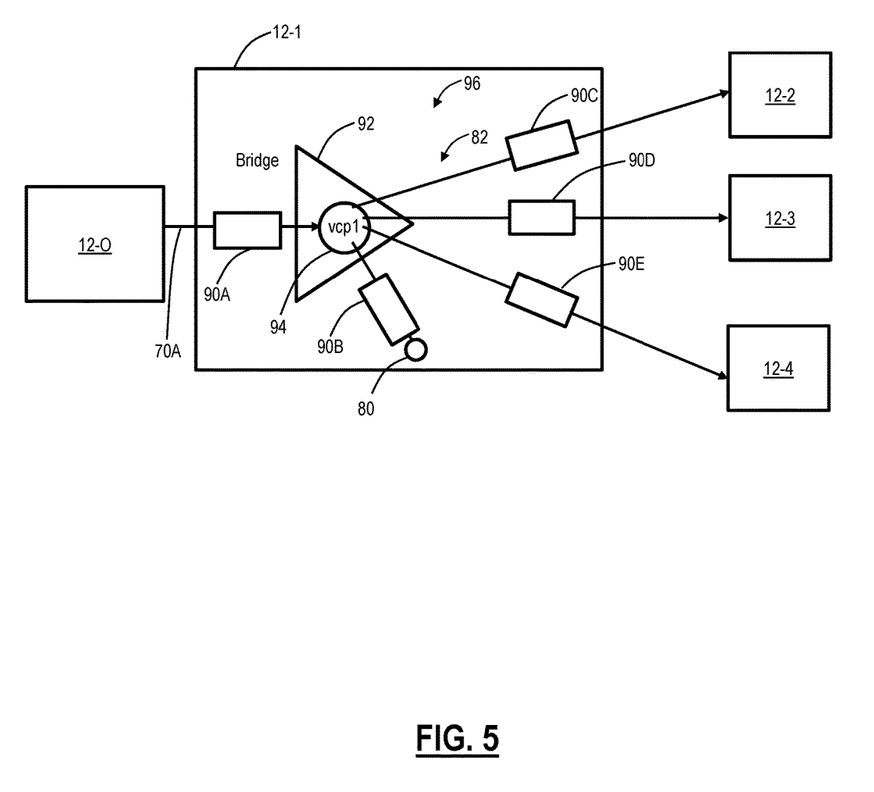
FIG. 5 is a logical diagram of bridging on an intermediate node with a drop point and with various branches of a multi-drop, unidirectional service.

Referring to FIG. 5, in an exemplary embodiment, a logical diagram illustrates bridging on an intermediate node 12-1 with a drop point 80 and with various branches 82 for a multi-drop, unidirectional service 70A. In this example, the node 12-1 is an intermediate node, receiving the multi-drop, unidirectional service 70A from an originating node 12-0. The node 12-1 includes various Connection Termination Points (CTPs) 90A, 90B, 90C, 90D, 90E. The multi-drop, unidirectional service 70A from the originating node 12-0 is coupled to the CTP 90A, providing the multi-drop, unidirectional service 70A to a bridge 92 which include a VCP 94. The multi-drop, unidirectional service 70A has one FCC 96 per node. The FCC 96 includes a single VCP 94 used only for bridging along with the CTPs 90. The VCP 94, acting as a sink, will source from the ingress port, i.e., the CTP 90A. The same VCP 94 will act as a source and will sink to single/multiple egress ports, i.e., the CTPs 90B, 90C, 90D, 90E.

Multi-Drop, Unidirectional Service Setup

Figure 6:
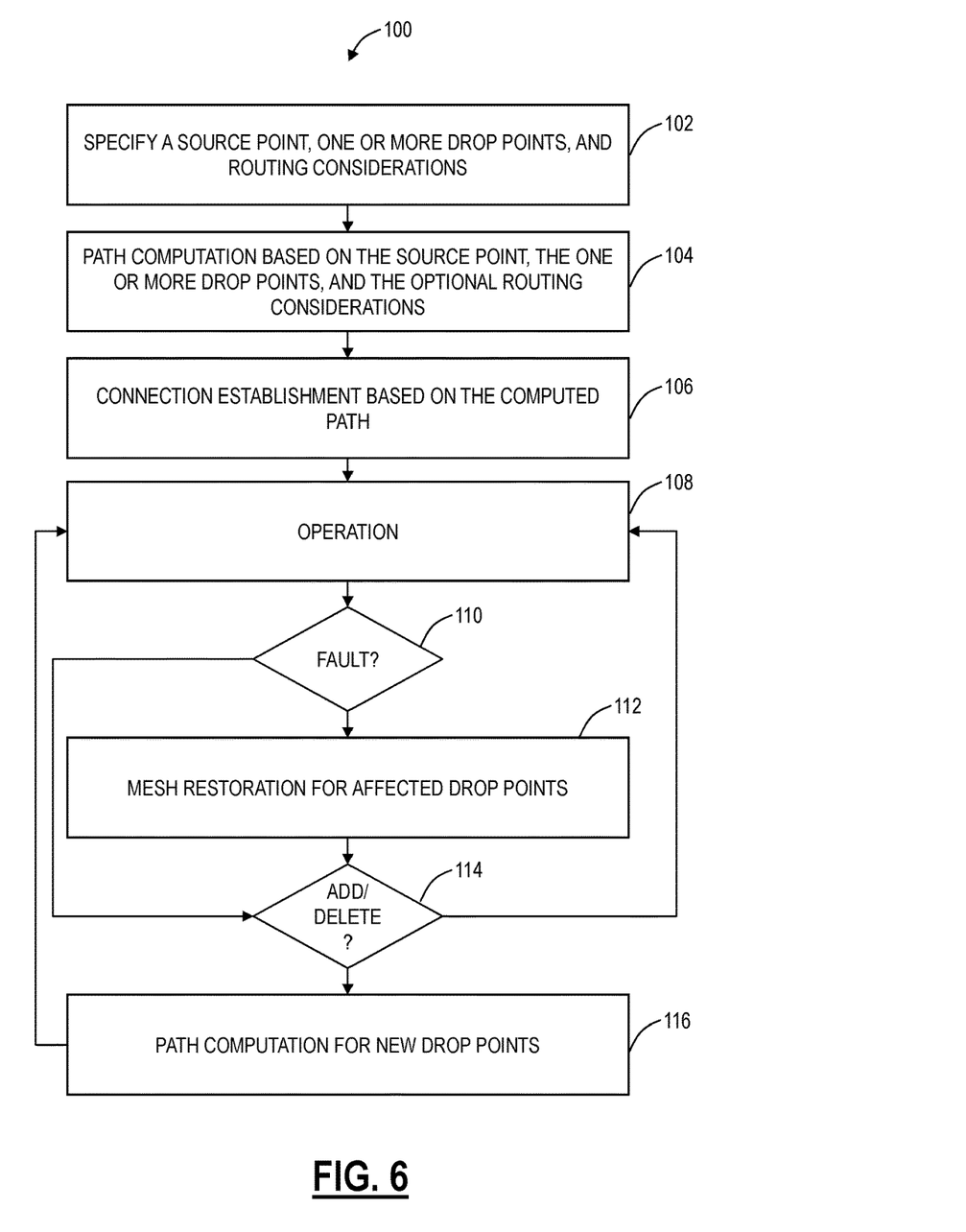
FIG. 6 is a flowchart of a multi-drop, unidirectional service setup process.

Referring to FIG. 6, in an exemplary embodiment, a flowchart illustrates a multi-drop, unidirectional service setup process 100. The multi-drop, unidirectional service setup process 100 can be implemented via the nodes 12, the control plane 16, and/or the SDN controller 18. First, the process 100 includes specifying a source point, one or more drop points, and routing considerations (step 102). To set up the multi-drop, unidirectional service 70, one or more drop points have to be specified on the nodes 12. For example, during SNC set up, a user can specify one source point and one or more drop points. Each drop point can have its own configuration (route) and status parameters (connection status and diagnostics). The routing considerations can be specified for path computation and may be based on optimal bandwidth, a shortest path, or a user designated route. On selecting the user designated route option, the user will be allowed to add a route to every drop point. If no routing consideration is selected, the process 100 can be based on the optimal bandwidth. Connection status and diagnostics will be specific to a drop point. Even if one of the drop points is not reachable, connections to other drop points can still be set-up.

Figure 7:
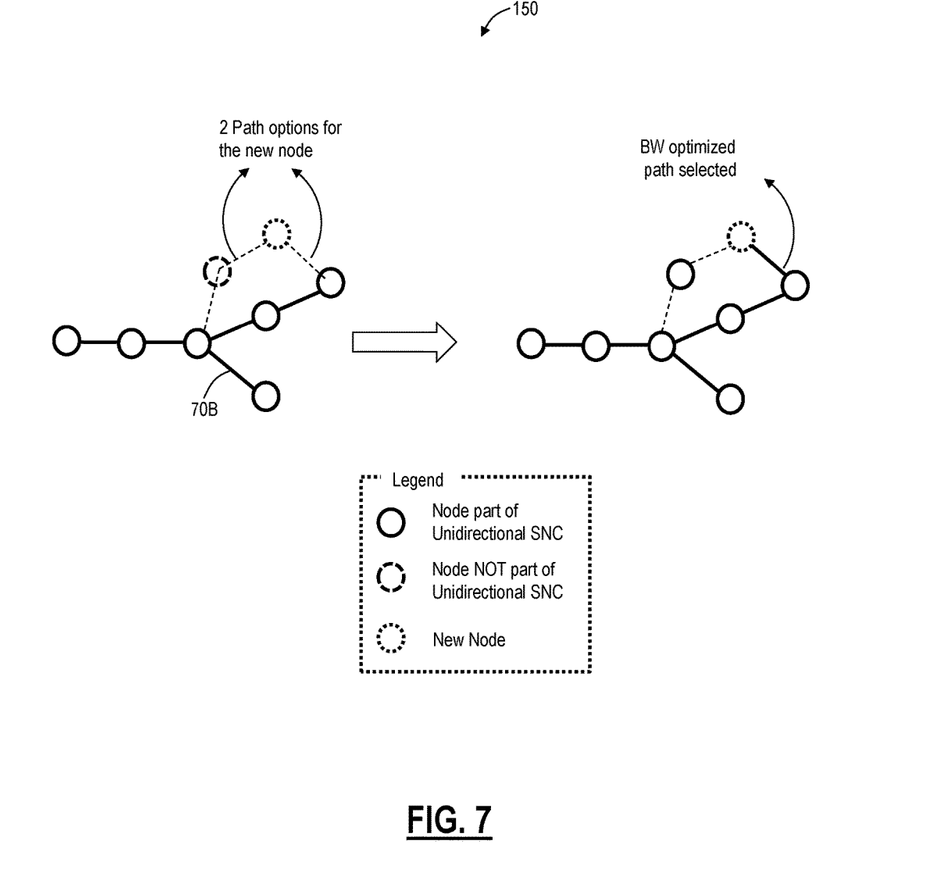
FIG. 7 is a network diagram of an example of optimal bandwidth routing for a multi-drop, unidirectional service.
Figure 8:
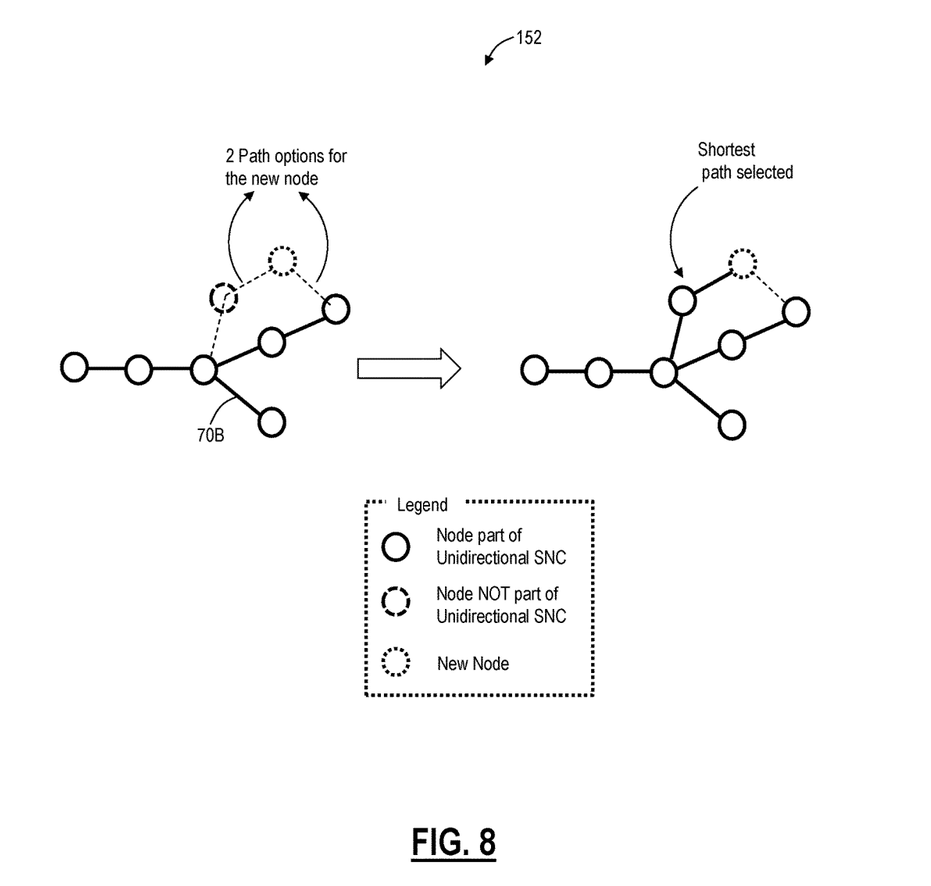
FIG. 8 is a network diagram of an example of shortest path routing for a multi-drop, unidirectional service.

Referring to FIGS. 7 and 8, in exemplary embodiments, network diagrams illustrate examples of optimal bandwidth routing 150 (FIG. 7) and shortest path routing 160 (FIG. 8) for a multi-drop, unidirectional service 70B. Again, the process 100 can include configurable routing considerations. In FIG. 7, for the optimal bandwidth routing 150, individual routes to multiple drop points may have common sections. This can be leveraged to prevent traffic duplication on the common sections thus optimizing network bandwidth. In FIG. 8, for the shortest path routing 152, for each drop point shortest available path will be calculated. This is irrespective of whether there is scope for bandwidth sharing or not, the routes used will be on the basis of shortest path calculated. If the shortest paths calculated for multi-drops converge at some section, bandwidth optimization can be used to avoid traffic duplication.

For the user designated route, with this option, the user can specify a route to each drop point. Once selected, routes should be specified to all the drop points. If routes are not selected to all drop points, routes to each of the drop points can be calculated based on the other selected criterion. The user can also specify whether the routes to the drop points will be exclusive or not. The routing considerations can be adhered to at the time of setup, mesh restoration, and addition or deletion of drop points.

Returning back to FIG. 6, path computation is performed for the multi-drop, unidirectional service 70 based on the source point, the one or more drop points, and the routing considerations (step 104). Once the path is computed, connection establishment occurs on the computed path (step 106). The connection establishment can be through the control plane 16 and/or the SDN controller 18. Once established, the multi-drop, unidirectional service 70 operates in the network (step 108).

During the operation (step 108), a fault can occur affecting one or more of the drop points (step 110). For example, on receiving a line down event, the originating node (or the SDN controller 18) can determine the affected drop points and initiate mesh restoration for only these drop points (step 112). The unaffected drop points will not be a part of the mesh restoration thus making mesh restoration hitless for them. The new route calculation (for the affected drop points) can be based on routing consideration specified in the process 100.

During the operation (step 108), addition and deletion of drop points can happen on any node for the multi-drop, unidirectional service 70 (step 114). The addition and deletion of drop points can happen on any node, namely intermediate nodes, existing terminating nodes, as well as nodes not currently part of a path on the current multi-drop, unidirectional service 70. For deletion of drop ports, the process 100 can include removing the associated connections, via the control plane 16 and/or the SDN controller 18, without impacting in-service drop points. For new drop ports, route calculation for the new drop points is done on the basis of the routing consideration setting (step 116), and the new route links are established, without impacting in-service drop points.

Referring back to FIG. 5, for example, the deletion of the drop point 80 occurs by adjusting the VCP 94 to remove the drop point 80, without affecting the CTPs 90C, 90D, 90E. Those of ordinary skill in the art will appreciate various other reconfigurations are possible based on the FCC 96. Changes to the FCC 96 are performed without affecting non-changing aspects.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for a multi-drop, unidirectional service in a network, the method comprising:
    responsive to a source point, one or more drop points, and a routing consideration, computing a path in the network;

causing establishment of the multi-drop, unidirectional service on the computed path, through one of a control plane and a Software Defined Networking (SDN) controller; and managing the multi-drop, unidirectional service through the one of the control plane and the SDN controller, wherein the managing includes responsive to a fault in the network affecting one or more drop points, causing mesh restoration for an alternate path to the affected one or more drop points, and causing establishment of the alternate path.

2. The method of claim 1, wherein the multi-drop, unidirectional service has the source point at an originating node, one or more drop points at associated intermediate nodes, zero or more intermediate nodes with no drop points, and one or more drop points at associated terminating nodes.

3. The method of claim 1, wherein the managing comprises:
responsive to a change in drop points the one or more drop points, implementing the change without affecting the one or more drop points.

4. The method of claim 1, wherein the managing comprises, at an intermediate node:
utilizing a Flexible Cross Connect with a single Virtual Connection Point used only for bridging.

5. The method of claim 1, wherein the routing consideration comprises one of optimal bandwidth where common sections are leveraged to multiple drop points, shortest path where a shortest path is used to each of the one or more drop points, and a user designated route where a user specifies the path.

6. The method of claim 1, wherein the managing utilizes the routing consideration during service creation, mesh restoration, and addition or deletion of drop points and adherence to the routing considerations is via a best effort to avoid any service disruption for existing drop points.

7. The method of claim 1, further comprising:
utilizing part of the computed path for a second multi-drop, unidirectional service, in an opposite direction as the multi-drop, unidirectional service.

8. The method of claim 1, wherein the multi-drop, unidirectional service is a Layer 1 Time Division Multiplexing (TDM) service.

9. A node in a network supporting a multi-drop, unidirectional service, the node comprising:
one or more ports; and
a controller communicatively coupled to the one or more ports, wherein the controller is configured to
responsive to a source point, one or more drop points, and a routing consideration, compute a path in the network,
cause establishment of the multi-drop, unidirectional service on the computed path, through one of a control plane and a Software Defined Networking (SDN) controller, and
manage the multi-drop, unidirectional service through the one of the control plane and the SDN controller, wherein, to manage the multi-drop, unidirectional service, the controller is configured to, responsive to a fault in the network affecting one or more drop points, cause mesh restoration for an alternate path to the affected one or more drop points, and cause establishment of the alternate path.

10. The node of claim 9, wherein the multi-drop, unidirectional service has the source point at an originating node, one or more drop points at associated intermediate nodes, zero or more intermediate nodes with no drop points, and one or more drop points at associated terminating nodes.

11. The node of claim 9, wherein, to manage the multi-drop, unidirectional service, the controller is configured to
responsive to a change in drop points the one or more drop points, cause the change without causing a service disruption for the existing one or more drop points.

12. The node of claim 9, wherein, to manage the multi-drop, unidirectional service, the controller is configured to
utilize a Flexible Cross Connect with a single Virtual Connection Point used only for bridging.

13. The node of claim 9, wherein the routing consideration comprises one of optimal bandwidth where common sections are leveraged to multiple drop points, shortest path where a shortest path is used to each of the one or more drop points, and a user designated route where a user specifies the path.

14. The node of claim 9, wherein, to manage the multi-drop, unidirectional service, the controller is configured to
utilize the routing consideration during service creation, mesh restoration, and addition or deletion of drop points and adherence to the routing considerations is via a best effort to avoid any service disruption for existing drop points.

15. The node of claim 9, wherein the controller is configured to
utilize part of the computed path for a second multi-drop, unidirectional service, in an opposite direction as the multi-drop, unidirectional service.

16. The node of claim 9, wherein the multi-drop, unidirectional service is a Layer 1 Time Division Multiplexing (TDM) service.

17. A network supporting a multi-drop, unidirectional service, the network comprising:
a plurality of nodes interconnected to one another via a plurality of links;
wherein the multi-drop, unidirectional service is established based on a computed path responsive to a source point, one or more drop points, and a routing consideration, through one of a control plane and a Software Defined Networking (SDN) controller, and
wherein the one of the control plane and the SDN controller are configured to manage the multi-drop, unidirectional service by, responsive to a fault in the network affecting one or more drop points, causing mesh restoration for an alternate path to the affected one or more drop points, and causing establishment of the alternate path.

18. The network of claim 17, wherein the multi-drop, unidirectional service has the source point at an originating node, one or more drop points at associated intermediate nodes, zero or more intermediate nodes with no drop points, and one or more drop points at associated terminating nodes.

* * * * *